Nov. 11, 1930.  C. F. CHISHOLM  1,781,437
METHOD OF BRAKING AND APPARATUS THEREFOR
Filed June 22, 1928  6 Sheets-Sheet 2

INVENTOR
Charles F. Chisholm

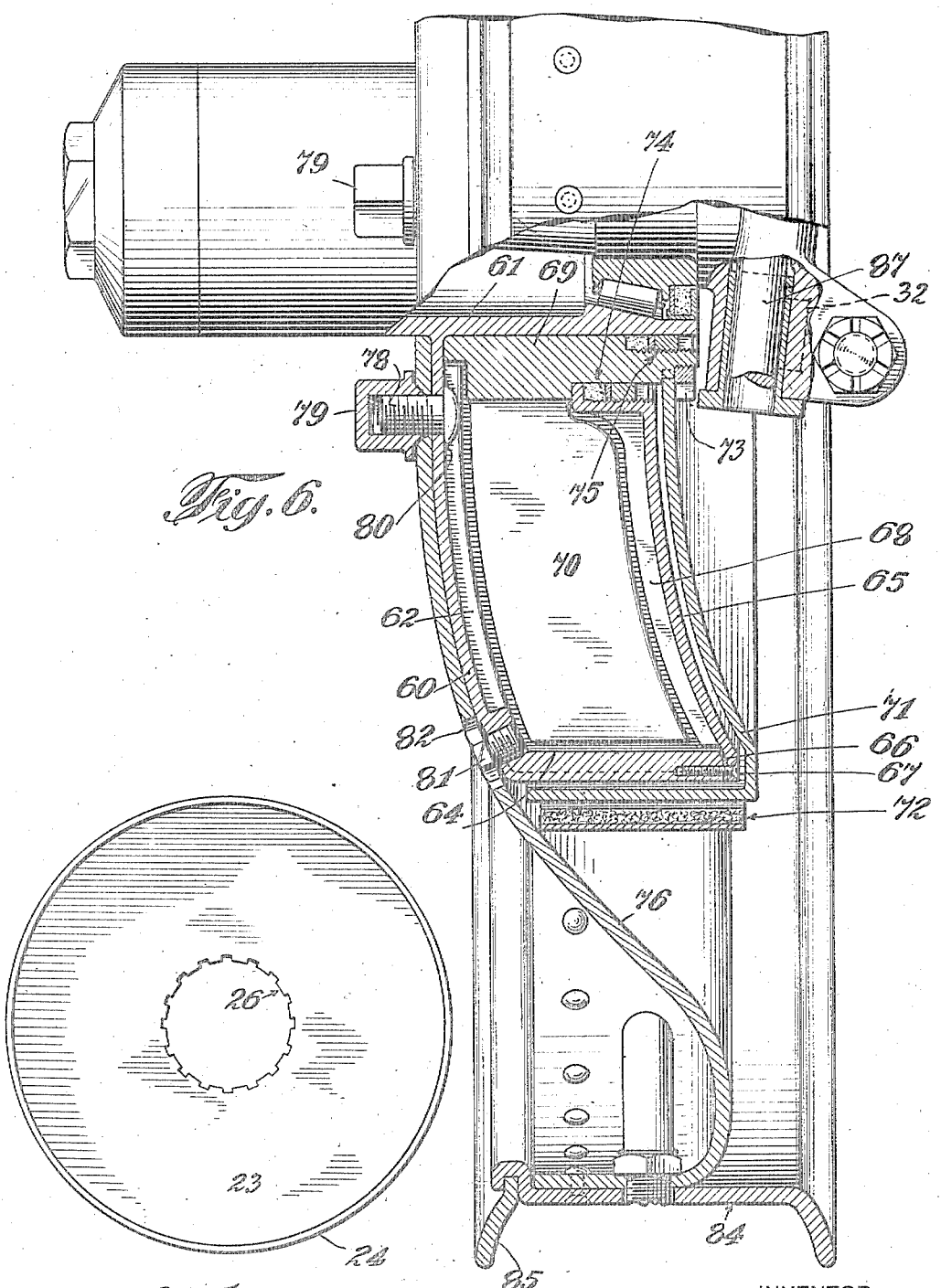

INVENTOR
Charles F. Chisholm

Patented Nov. 11, 1930

1,781,437

UNITED STATES PATENT OFFICE

CHARLES F. CHISHOLM, OF STATEN ISLAND, NEW YORK, ASSIGNOR OF ONE-HALF TO GEORGE RAMSEY, OF BROOKLYN, NEW YORK

METHOD OF BRAKING AND APPARATUS THEREFOR

Application filed June 22, 1928. Serial No. 287,374.

This invention relates to a method of braking and to an apparatus for carrying out such method. It is particularly applicable to automobiles and will be disclosed as applied to an automobile with a brake on each of the four wheels.

Heretofore in the art, braking on the front wheels (i. e. the steering road wheels) of an automobile has, under certain conditions, caused the loss of steering control of the car. On wet or icy pavements the friction between the road and the wheels is low and hence a comparatively small braking force will completely arrest rotation of the wheels and cause them to slide over the pavement. This is particularly true of the front wheels. While braking, the operator usually leaves the clutch in until the car has been brought to a slow speed, and hence the driving action of the engine prevents the rotation of the rear wheels (i. e. the driving wheels) from being completely arrested. The front wheels, however, are driven only by the friction between the wheels and the road, and hence under slippery road conditions their rotation is easily arrested.

If the front wheels cease to rotate, the car cannot be steered. The front wheels may be swung to one side or to the other as in steering, but they will slide in an angular position just the same as they will when directed straight forward, and hence swinging the wheels will not steer the car. This situation has caused many accidents. In an emergency the operator applies the brakes vigorously and it is difficult for him to tell whether or not the front wheels have ceased to rotate. If they have not ceased to rotate he may, while the brakes are applied, be able to steer the car in such manner as to avoid an obstacle in his path. On the other hand, if the brakes have completely arrested rotation of the front wheels, steering control of the car has been lost, and the car may slide directly into the obstacle that otherwise could have been avoided.

A usual practice is to so adjust the brakes that the braking force on the front wheels is less than it is on the rear wheels. This is relied upon to prevent the rotation of the front wheels from being completely arrested while the car is in motion. It is obvious that such an expedient can be only partially successful. Furthermore, it robs the front wheels of part of the braking force that could be used to advantage at high speeds on dry roads where the friction between the wheels and the road is high.

A general object of the present invention is to provide a method of and apparatus for braking a vehicle which insures constant steering control of the vehicle regardless of how slippery the pavement may be.

Another object of the invention is to provide a method of reducing the speed of a moving vehicle which insures rotation of the steering road wheels, (usually the front wheels) as long as the vehicle is in motion.

Another object of the invention is to provide a vehicle in which the steering road wheels may be braked without any danger of completely arresting their rotation while the vehicle is in motion.

An important object of the invention is to provide braking equipment for a vehicle road steering wheel which automatically limits the value of the available braking moment to the value of the turning moment which the road friction exerts on the wheel.

In accordance with the above and other objects, the invention has been disclosed in the form of a four wheel vehicle in which each of the front wheels (i. e. the steering road wheels) is equipped with a brake that consists essentially of a mechanical friction brake of conventional form operating in series with a fluid friction brake. The fluid friction brake has the characteristic of producing a braking force which increases as a power (usually taken as the square) of the speed of rotation. Accordingly, at substantial speeds the fluid friction brake is capable of producing a very high braking force, but as the speed of rotation of the wheel diminishes the braking force of the fluid friction brake falls off rapidly and at zero speed of rotation it has no braking force whatever. The result is that if the wheel so equipped tends to cease rotating while the car is in motion the braking moment immediately drops to a value corresponding to the turning moment of the road friction on the wheel so that the wheel continues to rotate as long as the car is in motion. No matter how slippery the road may be, there will always be some friction between the road and the wheel, so that while the car is in motion the wheel will always rotate, and thus steering control of the car is constantly maintained. To bring the car to a complete stop and maintain it there, the rear wheels are equipped with any suitable type of brake known to the art, e. g. the conventional internal expanding brake, or external contracting brake, or both.

Expressions such as "mechanical friction brake" and "fluid friction brake," as used in the specification and claims refer to the type of friction means which produces the braking moment per se. They do not refer to the type of means used to actuate the brake. Obviously, the brake may be actuated either by mechanical means or by fluid pressure means, as is common in the art.

Fig. 1 of the drawings is a vertical cross section (approximately on line 1—1 of Fig. 2) showing an artillery type front wheel of an automobile equipped with braking mechanism of the present invention.

Fig. 5 is a detail view on a reduced scale looking into the brake drum and showing the manner of attachment of the brake drum to the hub of the fluid brake.

Fig. 6 is a vertical section, partially in elevation, showing a modified form of the invention as applied to a disc type of wheel.

Figure 1:
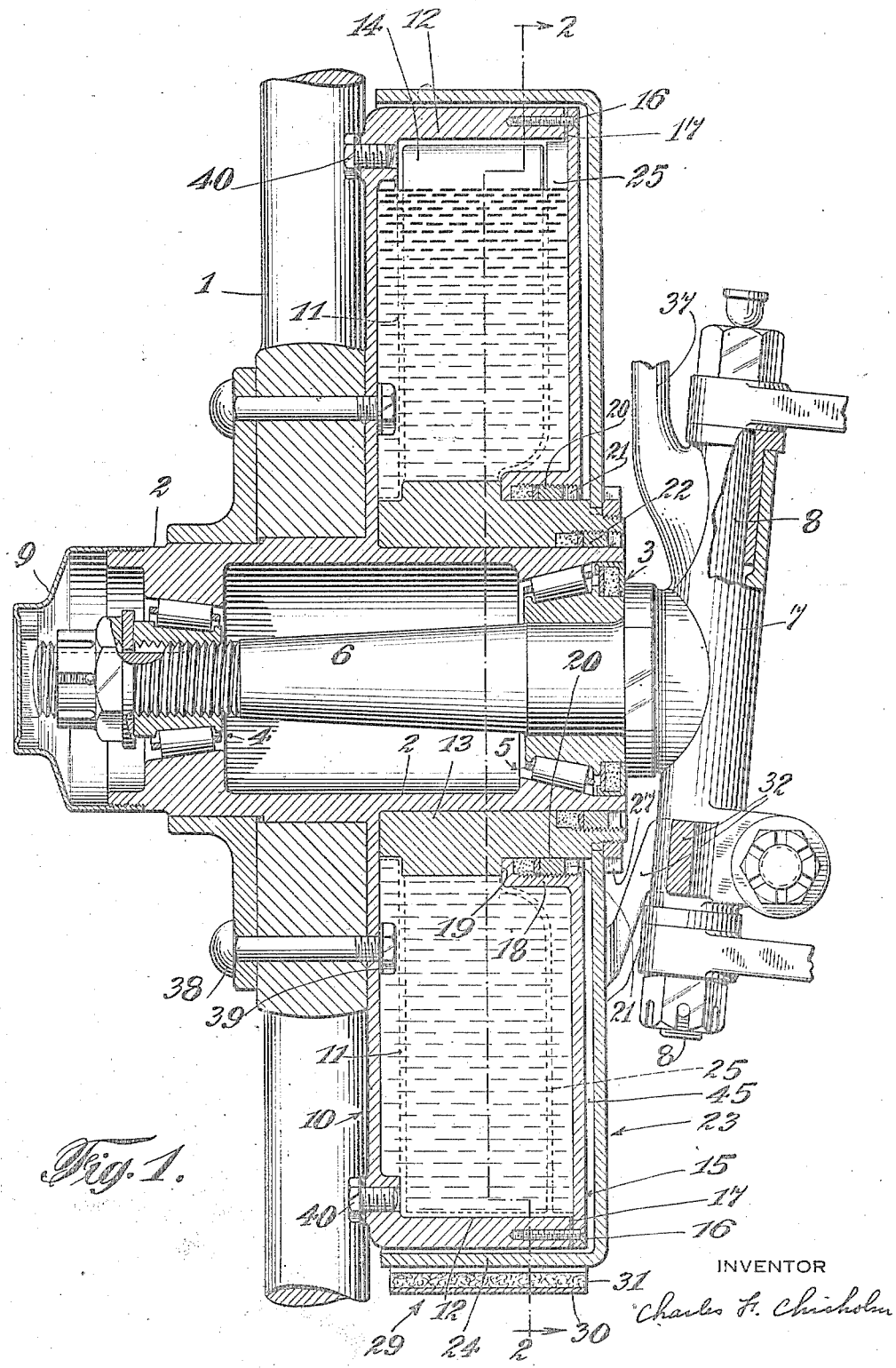

Reference will now be had to Fig. 1 of the drawings. An artillery type wheel having spokes 1 is mounted upon a hub 2 provided with roller bearings 4 and 5 that are interposed between the hub and a wheel axle 6. The wheel axle 6 is integral with a spindle which may be of any suitable form known to the art and may be pivotally attached to the end of the main car axle in any suitable manner known to the art. By way of example, axle 6 is shown as integral with a spindle 7 pierced by a king bolt 8 which secures the spindle 7 to the front main axle of a car, as is well understood in the art. The hub may be provided with the usual dust cap 3 and a hub cap 9. The construction described in this paragraph is a conventional one well known in the art, and hence only some of the more salient features have been referred to.

Figure 2:
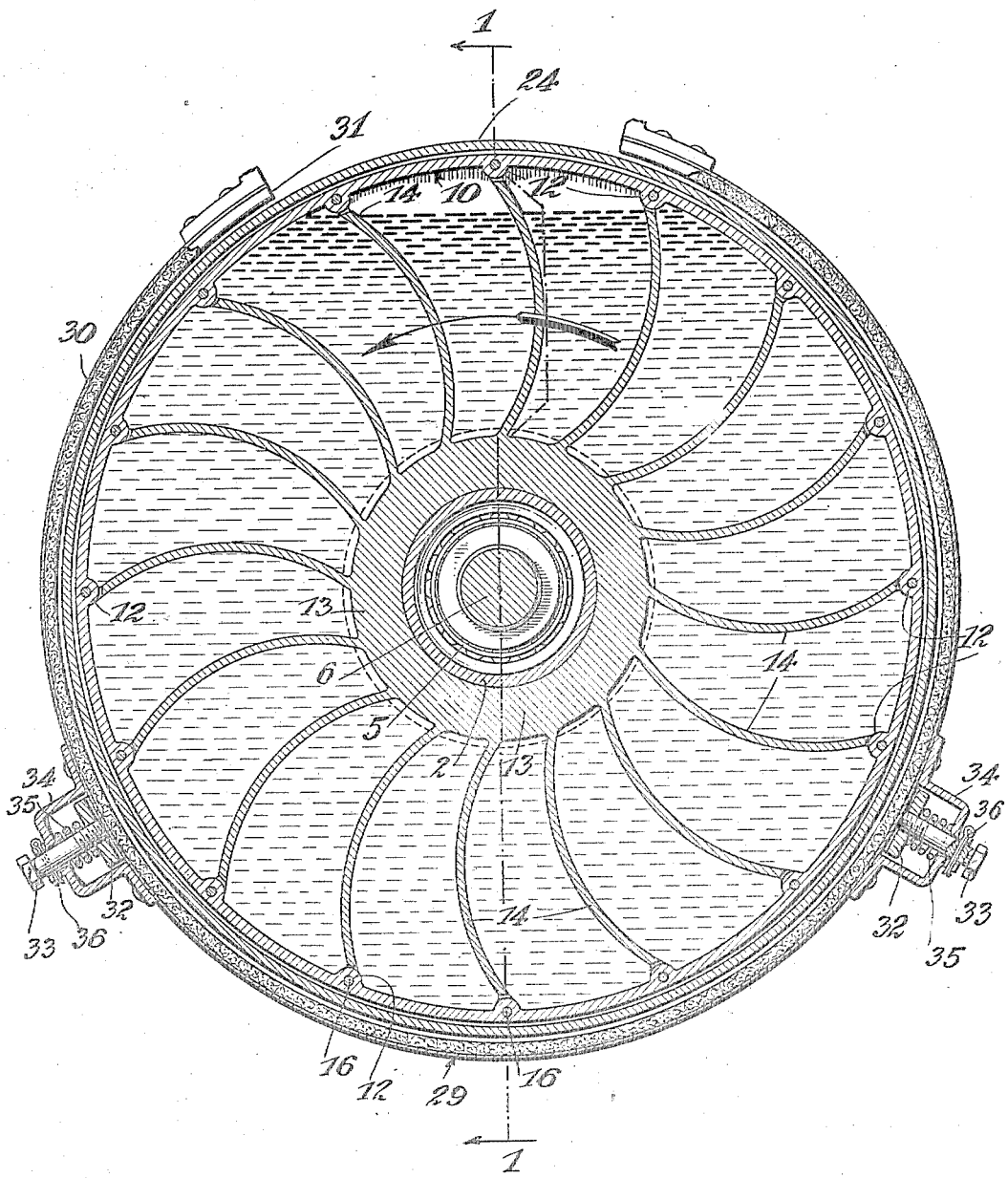
Fig. 2 is a vertical section taken approximately on the line 2—2 of Fig. 1.
Figure 3:
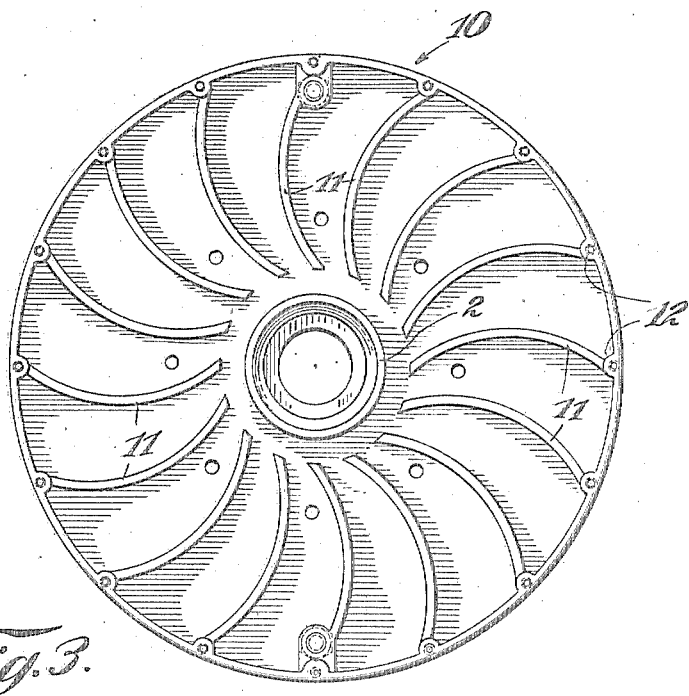
Fig. 3 is a detail view on a reduced scale looking into the fluid container casing (with closure removed) of the brake shown in Figs. 1 and 2.

Bolted to the inside of the wheel there is an annular casing designated as a whole by 10 (see also Figs. 2 and 3) which may be formed integral with the hub 2. The interior of the casing 10 is provided with a series of ribs or vanes 11 which are preferably integral with the casing and which extend in a generally radial direction as best shown in Fig. 3. At their outer extremities the ribs 11 merge into ribs 12 which extend outwardly along the inner cylindrical surface of the casing and are perpendicular to the ribs 11.

Figure 4:
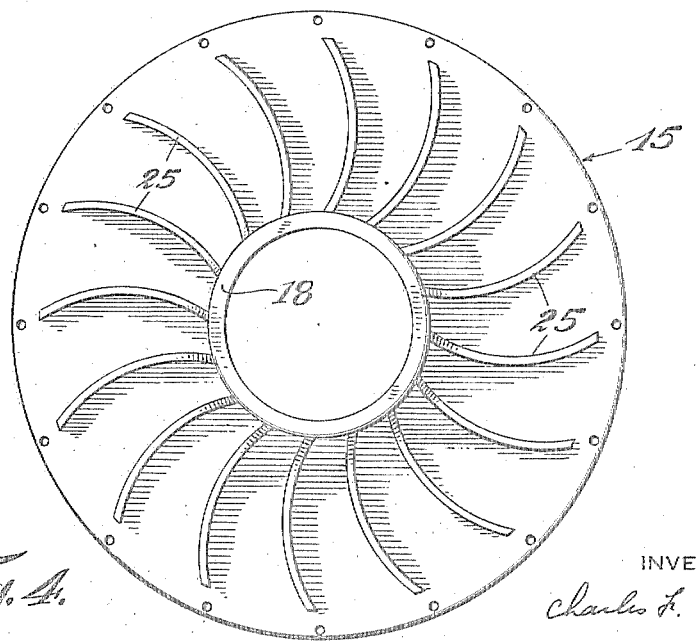
Fig. 4 is a detail view on a reduced scale showing the closure for the fluid container casing of the brake.

Rotatably mounted on the wheel hub 2 is an impeller hub 13 (Figs. 1 and 2) which carries a series of impeller blades 14 that may be formed integral with the hub 13. The blades 14 may correspond in number and configuration with the ribs 11. The casing 10 is provided with a closure designated as a whole by 15 (see also Fig. 4). This closure is fastened to the casing 10 by a series of screws 16, and there is provided a suitable gasket 17 which renders the joint between the closure and the casing liquid tight. As best shown in Figs. 2 and 3, the ribs or vanes 12 constitute an enlargement which gives sufficient metal for holding the screws 16 that secure the closure 15 to the casing. On the inner face of the closure there are a series of ribs or vanes 25 which are preferably integral with the closure. The ribs 25 may be of the same configuration as ribs 11 and be so positioned that there is a rib 25 in alignment throughout its length with each rib 11.

The central portion of the closure 15 is depressed at 18 (Figs. 1 and 3) and provided with a shoulder 19 that bears against a corresponding shoulder on the impeller hub 13, thus holding the impeller in place within the casing. Between the depressed portion 18 of the closure and the hub 13 there is provided suitable annular packing as shown, adapted to be compressed by a loose washer and a bushing 20 to make a liquid tight joint between the impeller hub and the closure of the casing. The bushing 20 may be screw threaded to the portion 18 of the closure and may be provided with slots 21 to receive a spanner wrench or the like for adjusting the bushing.

Between the hub 13 of the impeller and the hub 2 of the wheel there is a second annular recess which is provided with suitable annular packing compressed by a loose washer and a bushing 22 to make a liquid tight joint. The bushing 22 and packing associated therewith are similar to the bushing 20 and its packing. The casing 10 is thus completely liquid tight and, as shown in Figs. 1 and 2, is filled nearly full with a suitable liquid. If this liquid be sufficiently viscous and the parts are closely fitted, one or both of the packings at 20 and 22 may be omitted.

The casing 10 is embraced by a brake drum designated as a whole by 23 and having a braking portion 24. By means of the serrated formation shown at 26 in Fig. 5, this brake drum is mounted in fixed angular relation with respect to the impeller hub 13 and is held in place by a large nut 27 threaded onto the impeller hub as shown in Fig. 1.

The brake drum 23 is adapted to be engaged by an external contracting brake band designated as a whole by 29. This band may be of any suitable type and may be supported and actuated in any suitable manner known to the art. The means for supporting and actuating the brake band form no part of the present invention and hence illustrative means have been disclosed only in so far as helpful in understanding the operation of the present invention. The band may consist of a metallic band 30 provided with a fibrous facing 31 secured in any suitable manner to the band 30. The brake band may be mounted upon arms 32 which extend from the spindle 7 as shown in Figs. 1 and 2 and receive bolts 33 (Fig. 2) adapted to vary the clearance between the band facing 31 and the braking surface 24 of the brake drum. The brake band may be provided with stirrups 34 which are slidable on bolts 33 and are pressed outwardly by springs 35 so that the brake band is normally held away from the brake drum. When the band is contracted to apply the brake, springs 35 yield and the stirrups 34 slide inwardly on stationary bolts 33, thus permitting the band to grip the brake drum. Accidental rotation of the bolts 33 may be prevented by suitable cotter pins 36 which pierce the bolts and engage slots in the stirrups as shown. The brake band may be contracted and released by any suitable mechanism known to the art, which mechanism may be mounted on arm 37 which extends upwardly from the spindle 7.

The casing 10 may be secured to the spokes by the usual spoke bolts 38 which extend through the casing between the vanes 11. If necessary these bolts may be provided with suitable gasket washers 39 to prevent leakage of the liquid from the container. The container may also be provided with liquid tight removable plugs 40 for filling and draining the container. These plugs preferably open outwardly and are positioned between the spokes of the wheel.

When the wheel is rotating freely (brake not applied) the casing 10, the impeller blades 14, and the brake drum 23 all rotate at the same speed as the wheel. When the brake is applied the speed of the brake drum 23 is diminished and the speed of the impeller blades 14 is correspondingly diminished, while the casing 10 continues to rotate at the same speed as the wheel. Thus relative motion is set up between the casing 10 and the impeller blades 14 with the result that a braking moment is transmitted to the wheel by fluid friction which is set up in the casing. The value of the braking moment imposed on the wheel will be equal either to the braking moment produced by the brake band 29 on the brake drum 23, or to the braking moment produced by the fluid braking action within the casing 10, whichever tends to be the smaller. Since the mechanical friction brake and the fluid friction brake are operating in series, the resultant braking moment on the wheel will be equal to the one which tends to be the smaller of the two.

At high speeds the available braking moment of the liquid brake is very large. Hence as long as the speed is above a certain value the braking moment produced by the brake band 29 will tend to be the smaller one, and therefore the value of the braking moment impressed upon the wheel will be governed by the mechanical friction brake alone. Below this certain speed, the braking moment of the liquid brake will tend to be the smaller and the value of the braking moment impressed upon the wheel will be governed by the liquid brake alone, assuming of course that the mechanical friction brake is kept fully applied. With any given liquid brake, the available braking moment of the liquid brake is dependent only upon the relative speed between the impeller blades and the wheel, and as this relative speed becomes smaller, the braking moment of force falls off very rapidly and becomes negligible at very low wheel speeds.

Figure 8:
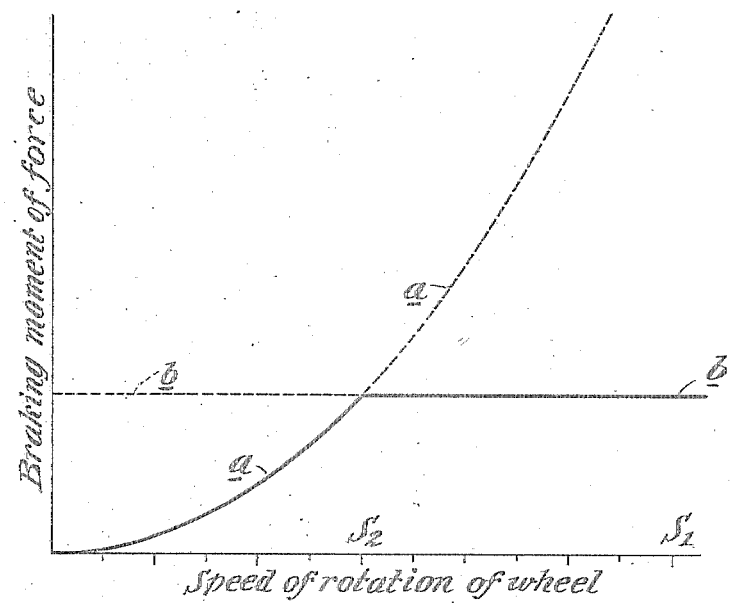
Fig. 8 is a curve showing braking moment of force plotted against speed of rotation of the wheel.

The action of the brake is illustrated by the curve in Fig. 8 in which the braking moments are plotted as ordinates and the speeds of rotation of the wheel are plotted as abscissas. The curve $a$ represents the available braking moment of the fluid brake alone. While this braking moment is very high at substantial wheel speeds, it falls to a negligible value before the wheel speed comes to rest. Considering the mechanical friction brake alone, the operator can exert a given braking moment which is substantially independent of the speed of rotation of the wheel. This braking moment is shown by the curve $b$. Of course, the braking moment actually effective on the wheel is equal to either the braking moment indicated by the curve $a$ or by curve $b$, whichever is smaller at the particular instant. If the brake be fully applied at speed $S_1$ and be kept fully applied, the braking moment upon the wheel will be constant, as shown by curve $b$ until the speed of rotation of the wheel has been reduced to speed $S_2$. At speed $S_2$ curve $b$ intersects with curve $a$ and thereafter curve $a$ has the smaller value. Accordingly, as the wheel speed drops below speed $S_2$ the braking moment exerted on the wheel will fall off in accordance with the solid portion of curve $a$. Therefore, as long as the speed of the wheel is above speed $S_2$, the brake functions in much the same manner as an ordinary mechanical friction brake. This is advantageous because at wheel speeds above speed $S_2$ a large portion of the energy absorbed by the brake is absorbed at the brake drum 23. There is an air space 45 between the brake drum and the liquid container so that the energy which is converted into heat at the brake drum is not transmitted to the liquid in the container.

For convenience the expression "available braking moment" is used in the specification and claims to mean the maximum braking moment that the braking equipment is capable of producing at any given instant, assuming that the friction between the road and the wheel is so high that the wheel will not slip on the road in any event. The expression "road friction turning moment" is used to mean the actual turning moment exerted on the wheel by the road friction. The moments of force which must be applied to the wheel to merely overcome the rotational inertia of the wheel itself are small in comparison to the moments which must be applied to change the speed of the car as a whole, and hence such moments will be neglected. Neglecting this factor the actual braking moment on the wheel at any given instant must, of course, be equal to the road friction turning moment. This is from the well known principle of physics that for each force there is an equal and opposite force. However, the available braking moment as above defined may be much greater than the road friction turning moment. If the available braking moment is greater, an attempt to exert it results in a complete arrest of rotation of the wheel.

It is apparent that with the brake of the present invention it is impossible to completely arrest rotation of the front wheels (i. e., the steering road wheels) as long as the car is in motion. If the brake drum 23 be brought to rest the impeller blades 14 become stationary and the braking moment actually applied to the wheel is then determined only by the speed of rotation of the wheel. No matter how slippery the road, there will always be some road friction turning moment and this will cause the wheel to rotate at such speed that the then available braking moment of the liquid brake is not greater than the road friction turning moment. Accordingly, the construction operates to automatically limit the available braking moment at any given instant to the road friction moment at that given instant.

For convenience Fig. 2 (also Figs. 9 to 12) of the drawing contains an arrow indicating the direction of rotation (during braking) of the impeller relative to the casing 10. With reference to the earth the impeller is slowed down or even brought to rest (as far as rotation is concerned) while the casing 10 continues to rotate with the wheel. However, the impeller rotates relative to the casing as indicated by the arrow.

Figure 7:
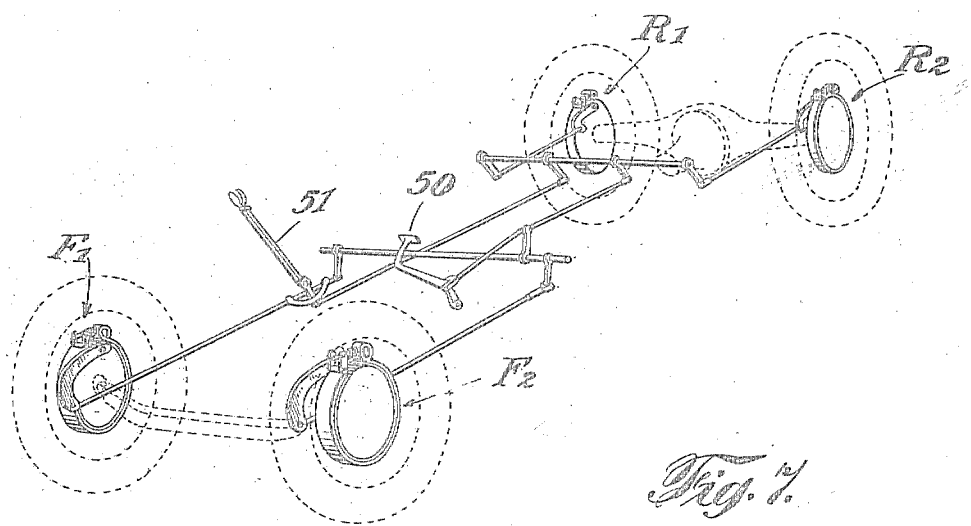
Fig. 7 is a diagrammatic perspective view of the braking system of the entire car.

Of course, a brake such as shown in Fig. 1 will neither bring the car completely to rest nor maintain it there, and accordingly the rear wheels are equipped with any usual type of brake in which the braking force does not disappear as the wheel comes to rest. As shown diagrammatically in Fig. 7, the chassis is provided with a foot pedal 50 which controls the brakes on all four wheels, and with a hand lever 51 which controls brakes on the rear wheels. The brakes $F_1$ and $F_2$ (on the front or steering road wheels) are of the type just described comprising a mechanical friction brake operating in series with a fluid brake. The brakes $R_1$ and $R_2$ (on the rear wheels) are of any conventional type in which the braking force may be maintained independently of the rotation of the wheels.

The brake shown in Fig. 6 operates on the same principle as the brake shown in Fig. 1, but the entire brake construction is of dished form and it is nested within a disc wheel. The construction comprises a fluid tight container 60 which may be formed integral with the wheel hub 61. The bottom and side walls of the container are provided with fins or ribs 62 and 64 respectively. The container is closed by a closure 65 provided with a fluid tight gasket 66 and held in place by screws 67. The closure 65 is provided with fins or ribs 68 which may correspond in form with ribs 62 and be in alignment therewith. Within the container there is an impeller hub 69 carrying impeller blades 70 which may be curved as shown in Fig. 2. A brake drum 71 is adapted to be engaged by an external contacting brake designated as a whole by 72. This brake drum is serrated at its center as shown in Fig. 5, and is locked in fixed angular relationship with respect to the impeller hub. A suitable nut 73 retains the brake drum in place. If necessary, suitable liquid tight packing may be provided at 74 and 75. A disc wheel 76 is demountably attached to the casing 60 by means of a plurality of studs 78 (one shown) and the usual nuts 79. The stud 78 projects through the casing 60 between the fins 62, and may be welded in place as indicated at 80.

The casing 60 is provided with liquid tight plugs, one of which is shown at 81 for draining and refilling the container. The disc wheel may be provided with suitable holes as shown at 82 to give access to the plugs. The wheel 76 may be provided with any suitable rim for holding the tire such as the rim shown at 84 provided with a split ring 85 which is removable for mounting and demounting the tire. This modified form of the invention has been only briefly described, because, as clearly shown in the drawings, many of the features of construction are similar to those shown in Fig. 1.

The construction of the brake and wheel shown in Fig. 6 is a particularly advantageous one because it brings the king bolt 87 close to the vertical plane passing through the center line of the tire on the road. The axis of the bolt 87 (also bolt 8 in Fig. 1) is preferably so tilted that a prolongation of it will pass through the center line of the tire on the road. With such an arrangement the lateral forces exerted on the spindle bearings are minimized, and swinging the wheels to steer the vehicle does not cause the wheels to roll. In practice the wheel may be mounted vertically, or the bolt 87 may be placed in a vertical position so that the wheel is tipped outwardly. In some cases it may be desirable to place the spindle in an intermediate position between the two extremes.

The liquid used in the container is preferably one whose viscosity does not change too much with change of temperature. Brakes embodying the invention may be designated for liquids of various viscosities, but it is desirable that the viscosity of the liquid shall not become too high at winter temperatures. Oils or other fluids such as used in shock absorbers, glycerine, glycerine mixed with a little alcohol, castor oil, and porpoise oil are mentioned as illustrative. If a liquid of low viscosity be employed, the curvature (if any) of the impeller blades may correspond to the curvature of the ribs of the container and its closure, and the clearance between them may be small. Then when the impeller blades are passing the container ribs, the only liquid passages are those given by the lateral clearance between the blades and the ribs which surround it.

The arrangements of impeller blades and container vanes shown diagrammatically in Figs. 9 to 12 give various arrangements of liquid passages, each having certain advantages. In these figures inner circles 90 represent the impeller hub, and outer circles 91 represent the outer circular wall of the fluid tight container.

Figure 9:
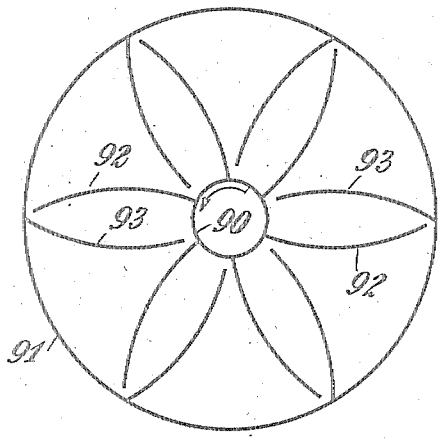
Fig. 9 illustrates diagrammatically an alternative configuration of impeller blades and casing vanes.

In Fig. 9 the impeller blades 92 are curved oppositely to the container vanes 93. This gives substantial liquid passages at all times because the impeller blades are never wholly aligned with the vanes of the casing.

Figure 10:
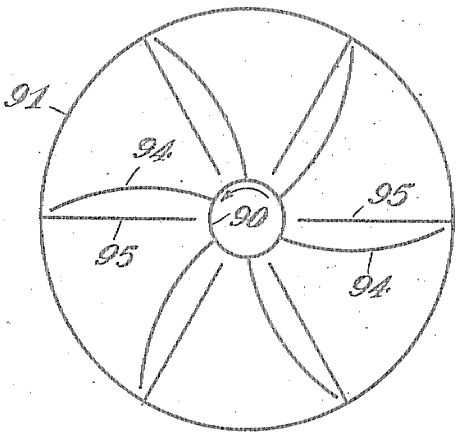
Fig. 10 illustrates diagrammatically a third configuration of impeller blades and casing vanes.

Instead of having both sets of blades or vanes curved, one set may be straight and the other set curved. For example, Fig. 10 shows curved impeller blades 94 and straight container vanes 95. This gives substantial liquid passages at all times, but not as large as are given by Fig. 9.

A more uniform braking action of the liquid brake may be obtained by causing the impeller blades to align progressively with the container vanes. This may be done by giving the impeller a number of blades which is different from the number of sets of container vanes. For example, in Fig. 11 there are ten impeller blades 96 and twelve sets of container vanes 97. Alignment takes place first at $c$ and $c'$, then at $d$ and $d'$, then at $e$ and $e'$, then at $f$ and $f'$, and finally at $g$ and $g'$.

Figure 11:
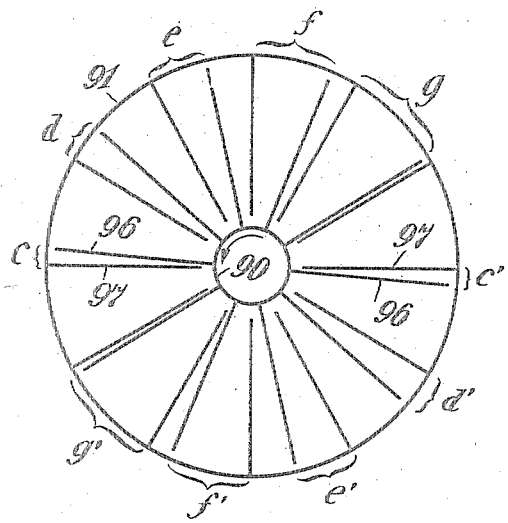
Fig. 11 illustrates diagrammatically a fourth configuration and arrangement of impeller blades and casing vanes.
Figure 12:
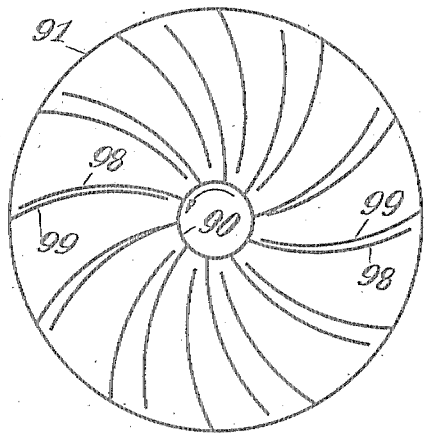
Fig. 12 illustrates diagrammatically the arrangement of blades and vanes shown in Fig. 11, but applied to curved blades and vanes.

In Fig. 11 both the impeller blades and the container vanes are straight, but obviously, the straight blades may be used without the progressive alignment, and the progressive alignment may be obtained with any configuration of blades. For example, Fig. 12 shows an arrangement with curved impeller blades and container vanes. There are ten impeller blades 98 and twelve sets of container vanes 99 arranged to give progressive alignment as in Fig. 11.

The present invention may be embodied in forms other than the ones particularly disclosed, and the method of braking may be practiced by various forms and types of apparatuses. Accordingly, the disclosure is merely illustrative in compliance with the patent laws and is not to be considered as limiting.

Having thus described my invention, what I claim is:

1. The method of reducing the speed of a moving vehicle provided with non-steering road wheels and steering road wheels which comprises applying braking moments to both the steering and the non-steering wheels, progressively reducing the value of the available braking moments on the steering wheels as the speed of rotation of such wheels diminishes, and maintaining the braking moments on the non-steering wheels independently of their speed of rotation.

2. The method of reducing the speed of a moving vehicle provided with non-steering road wheels and steering road wheels which comprises applying braking moments to both the steering and the non-steering wheels, and progressively reducing the value of the available braking moments on the steering wheels as the speed of rotation of such wheels diminishes.

3. The method of reducing the speed of a moving vehicle provided with non-steering road wheels and steering road wheels which comprises applying braking moments to both the steering and the non-steering wheels, maintaining the braking moments on the steering wheels as long as their rotative speed is above a certain value and thereafter progressively reducing the value of such braking moments in response to the diminution in the rotative speed of the steering wheels, and maintaining the braking moments on the non-steering wheels independently of their speed of rotation.

4. The method of reducing the speed of a moving vehicle provided with non-steering road wheels and steering road wheels which comprises applying braking moments to both the steering and the non-steering wheels, and automatically limiting the value of the available braking moment on a steering wheel to the road friction turning moment acting on such wheel.

5. The method of reducing the speed of a moving vehicle provided with non-steering road wheels and steering road wheels which comprises applying braking moments to both the steering and the non-steering wheels, and progressively varying the value of the braking moments on the non-steering wheels in response to their speed of rotation.

6. The method of reducing the speed of a moving vehicle provided with non-steering road wheels and steering road wheels which comprises applying braking moments to both the steering and non-steering wheels, progressively varying the value of the braking moments on the steering wheels in response to their speed rotation, and maintaining the braking moments on the non-steering wheels independently of their speed of rotation.

7. The method of braking a vehicle road wheel which comprises applying a braking moment to the wheel, and limiting the maximum value of the available braking moment to the road friction turning moment acting on the wheel, while progressively varying the value of the braking moment in response to the speed of rotation of the wheel.

8. A vehicle comprising steering road wheels and non-steering road wheels, mechanical friction braking means operative to produce braking moments on the non-steering wheels and fluid friction braking means operative to produce braking moments on the steering wheels.

9. A vehicle comprising steering road wheels and non-steering road wheels, mechanical friction braking means operative to produce braking moments on the non-steering wheels, and other braking means operative to produce braking moments on the steering wheels, said other braking means comprising a mechanical friction brake operating in series with a fluid friction brake.

10. In combination, a vehicle road wheel, a casing rotatable with said wheel, said casing being adapted to contain a liquid, an impeller within said casing, and means to retard the rotation of said impeller.

11. In combination, a vehicle road wheel, a casing rotatable with said wheel, said casing being adapted to contain a fluid, an impeller within said casing, and a mechanical friction brake operative to retard the motion of said impeller.

12. In combination, a casing adapted to contain a fluid, an impeller mounted within said casing for rotation relative thereto, a vehicle road wheel rotatable with one of said elements, and means to retard the rotation of the other of said elements.

13. A brake for vehicles comprising a mechanical friction brake, a liquid friction brake, and means to operatively connect said brakes in series.

14. A vehicle comprising steering and non-steering road wheels, means to apply braking moments to both sets of wheels, and means to reduce the value of the braking moments on the steering wheels as their speed of rotation diminishes.

15. A vehicle comprising at least one non-steering road wheel and at least one steering road wheel, means to apply a braking moment to the non-steering wheels, and means to apply a braking moment to the steering wheel and reduce the value of such braking moment as the speed of rotation of the steering wheel diminishes.

16. A vehicle comprising at least one non-steering road wheel and at least one steering road wheel, means to apply a braking moment to the non-steering wheel, and means to apply a braking moment to the steering wheel and automatically limit the available value of such braking moment to the road friction moment acting on said steering wheel.

17. The method of reducing the speed of a moving vehicle provided with a plurality of road wheels which comprises applying braking moments to at least two of the wheels, progressively reducing the value of the available braking moment on at least one of the wheels as the speed of rotation of such wheel diminishes, and maintaining the braking moment on at least one of the remaining wheels independently of its speed of rotation.

18. A vehicle comprising a plurality of road wheels, means to apply braking moments to at least two of the wheels, and means to automatically reduce the value of the braking moment on at least one wheel as the speed of rotation of such wheel diminishes.

CHARLES F. CHISHOLM.